(12) United States Patent
Jensen et al.

(10) Patent No.: US 7,106,450 B2
(45) Date of Patent: Sep. 12, 2006

(54) DETERMINATION OF A DEVICE SIGNAL RESPONSE CHARACTERISTIC USING MULTIPLE VARIED SIGNALS

(75) Inventors: Thomas Jensen, Stuttgart (DE); Bernd Nebendahl, Ditzingen (DE); Ruediger Maestle, Böblingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 416 days.

(21) Appl. No.: 10/641,781

(22) Filed: Aug. 15, 2003

(65) Prior Publication Data
US 2004/0119479 A1   Jun. 24, 2004

(30) Foreign Application Priority Data
Dec. 20, 2002 (EP) .................................. 02102857

(51) Int. Cl.
*G01B 9/02* (2006.01)
(52) U.S. Cl. ...................................... 356/477; 356/73.1
(58) Field of Classification Search ............... 356/73.1, 356/477; 250/227.19, 227.27; 385/12
See application file for complete search history.

(56) References Cited

U.S. PATENT DOCUMENTS 6,825,934 B1* 11/2004 Baney et al. ................ 356/477

FOREIGN PATENT DOCUMENTS

| EP | 1018642 A2 | 7/2000 |
|---|---|---|
| EP | 1207377 A2 | 5/2002 |

* cited by examiner

*Primary Examiner*—Gregory J. Toatley, Jr.
*Assistant Examiner*—Samuel A. Turner

(57) ABSTRACT

For determining a signal response characteristic of a device, a first signal is varied with a first function of time and simultaneously a second signal is varied with a second function of time, wherein the first function is different from the second function. The first and second signals are coupled to the device, wherein the device is exposed to a time-dependent disturbance signal. A signal response is received from the device in response to the first and second signals and the time-dependent disturbance signal. The signal response characteristic is derived by analyzing the received signal response in conjunction with the first and second signals, or a signal derived therefrom, and at least partially removing the time-dependent disturbance signal using the received signal response and the first and second signals, or a signal derived therefrom.

26 Claims, 5 Drawing Sheets

DETERMINATION OF A DEVICE SIGNAL RESPONSE CHARACTERISTIC USING MULTIPLE VARIED SIGNALS

BACKGROUND OF THE INVENTION

The present invention relates to determining a signal response characteristic of a device under test (DUT).

The determination of signal response characteristics of devices is a common object in communication measurement device industries. In particular, the derivation of response characteristics of optical, electrical and/or acoustic devices acquires an increasing interest in research and development.

One known approach is to perform interferometric measurements, wherein, e.g., by means of a variation of runtime an incoming signal that is split and guided through the DUT as well as being guided directly to a detector unit an interferogram can be taken and analyzed for deriving intensity transmission, polarization and/or group delay characteristics, etc. For example, the runtime through the device varies as a result of frequency change. A corresponding device dependent characteristic group delay leads to a constructive or destructive interference with a signal split off the incoming signal not passing the DUT.

A description of a known interferometric determination of signal response characteristics of DUTs relating, e.g., to optical devices, is provided in EP 1 207 377 A2. The teaching thereof is incorporated herein by reference.

SUMMARY OF THE INVENTION

It is an object of the present invention to improve determining signal response characteristics of a DUT. The object is solved by the independent claims. Preferred embodiments are provided by the dependent claims.

According to an embodiment of the present invention, a first and at least a second signal are each generated using wavelength tunable signal sources. At least for a time span, the signals are generated simultaneously by both signal sources for enabling a superposition of the signals generated. Preferably, both signals generated imply substantially narrow linewidths in order to provide an easy analysis of signals, when these are heterodyned in a subsequent process step thereby attaining signals having differing wavelengths. The terms "heterodyned" and "superimposed" are used in the following in the sense of synonyms.

According to the number of signals generated a corresponding number of signal sources are utilized. However, in case of one signal source being capable of generating two signals simultaneously, it is possible to apply a reduced number of sources. A signal source according to the present invention is also provided with a means for tuning the wavelength. An example is given by signal sources comprising tunable cavities, e.g. external Littmann or Litrow cavities as being typically used in optics applications.

While simultaneously coupling in the at least two signals, the signal sources are applied independently (preferably each tuned in wavelength) each utilizing a different functional dependence of wavelength vs. time. The at least two functional behaviors for each signal generated can have any form, but a simple polynomial representation is preferred. In a most preferred embodiment a linear increase or decrease of wavelength with time is provided. Each signal is provided with a unique polynomial coefficient. In what follows the functional variation of wavelength with time is denoted as a sweep speed.

A feature of the present invention is that both functional dependencies (e.g. of wavelength) vs. time (which might also be referred to as sweep speeds) are different between the first and second signals generated, e.g. a difference in wavelength between both signals varies with time.

One embodiment relates to an aspect, where the wavelength of the first signal is varied in time having a specific functional behavior, e.g. constant sweep speed, and the wavelength of the second signal is varied preferably infinitely slow. That is, a wavelength of the second signal is practically held substantially constant. In this case the disturbance signal modulates the second signal such that a quasi-DC-signal is obtained. However, the interferometer measurement also generates a quasi-DC-signal. Preferably, an amplitude modulation of the second signal is provided to improve separating the interferometer signal and the disturbance signal.

In one embodiment, at least one of the first and second signals is modulated, preferably in at least one of amplitude and wavelength. Preferably, one of the first and second signals is modulated while the other is tuned in wavelength over the time.

The first and second signals are simultaneously input via an incoming signal path into the DUT. There, a signal response behavior of the device e.g. leading to a characteristic group delay of the device is applied to the signals in dependence of actual signal frequency.

However, external disturbances can influence the signal response characteristic of the device in addition to the wavelength dependent internal characteristic. These external disturbances usually comprise a time-dependent behavior.

For example, optical DUTs being part of an interferometer arm can be subject to vibrations or acoustic noise, etc., which can influence the interferometric measurement. The external disturbances may affect phase information of the incoming and delayed signal.

As a consequence, the incoming first and second signals can be thus modulated by such time-dependent disturbance signals.

According to an embodiment, the wavelength dependent response characteristic is at least partially separated from the time-dependent external disturbance, or in other words the time-dependent external disturbance is at least partially removed from the wavelength dependent response characteristic. Due to the different functional dependence of wavelength with time the information provided with each of the two signals can independently be retained e.g. in an interferometric measurement. To achieve this, the first and second signals can be split each into a first and a second portion. The first portion is coupled into the DUT as already explained above. The second portion is subsequently heterodyned with the two signals of the first portion. Thus, four signals are heterodyned with each other.

In one embodiment, the interferometer arm comprising the DUT has a considerably longer signal path than that signal path, which the split-off portion takes, the latter portion being also called "local oscillator". As a result the first signal having passed the DUT and being heterodyned with its local oscillator has a slightly different wavelength due to the meanwhile tuned wavelength. A heterodyned signal is therefore created having a low carrier frequency that is proportional to the interferometer arm length, and in case of a linear variation of tuned wavelength of time it depends on the sweep speed. Choosing different sweep speeds, thus different carrier frequencies are obtained for each of the heterodyned signals.

An advantage is therefore that information about the signal response characteristic is retained in both heterodyned signals as well as time-dependent disturbance information. Since two independent heterodyned signals can be analyzed in order to derive a device characteristic response signal and a time-dependent disturbance signal separately, mathematical and signal-processing analysis becomes possible in order to retrieve the desired information. Consequently, the time-dependent disturbance signal can be obtained and subtracted from a measured interference signal, which can lead to an improved quality of signal response characteristics of DUTs.

The present invention is not restricted to utilizing two signal sources generating two independent signals. Multiple signals can be generated and coupled into the measurement system and the DUT in order to even improve the degree of analyzing and separating the external disturbance signal.

In a further aspect a time mark is established, where the wavelengths of both the first and the second signal generated are the same. This feature considerably improves further signal processing of the heterodyned signals utilizing information obtained from one heterodyned signal and inputting the information into analysis of the other heterodyned signal.

The invention can be partly or entirely embodied or supported by one or more suitable software programs, which can be stored on or otherwise provided by any kind of data carrier, and which might be executed in or by any suitable data processing unit. Software programs or routines are preferably applied in connection with the detector unit for performing the signal processing and analyzing data. In particular, a unit carrying out a Fourier transform (FFT) can be applied to retrieve wavelength and time-dependent information from the signals recorded.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

FIG. 7 shows (a) a group delay function generated by Fourier-expanding the correlation function displayed in FIG. 6b together with a group delay function including an absorption feature displayed in FIG. 3, and (b) a group delay function resulting from subtracting the signals shown in FIG. 7a.

DETAILED DESCRIPTION OF EMBODIMENTS OF THE INVENTION

Figure 1:
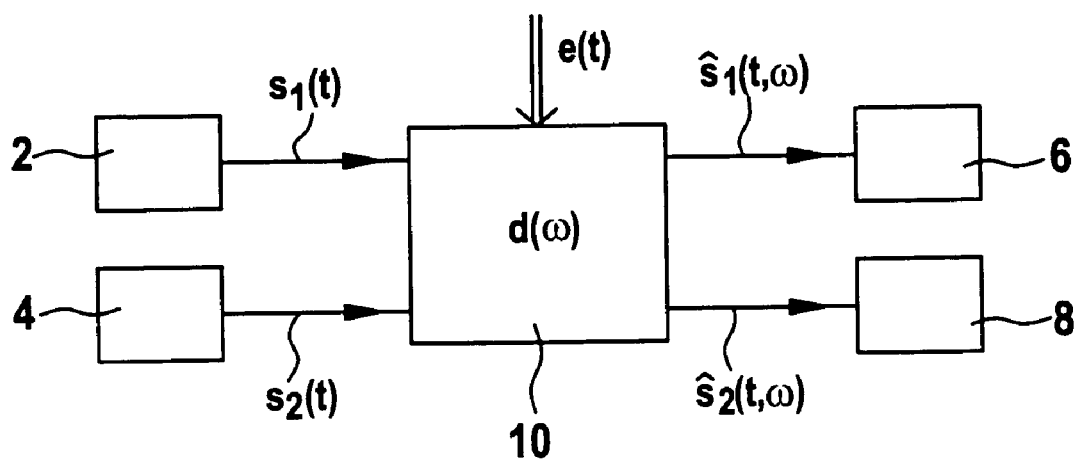
FIG. 1 shows a diagram revealing the principle features of the invention.

An embodiment of the invention revealing its fundamental principles while referring to optical devices is shown in FIG. 1. A first and a second tunable laser source 2, 4 each generate and send out signals $s_1(t)$ and $s_2(t)$. These are coupled in to an optical device 10 having a wavelength dependent response characteristic $d(\omega)$. The optical device 10 is prone to external disturbances, e.g. vibration. These disturbances modulate signals $s_1(t)$ and $s_2(t)$ with a time-dependent disturbance signal $e(t)$.

Figure 2:
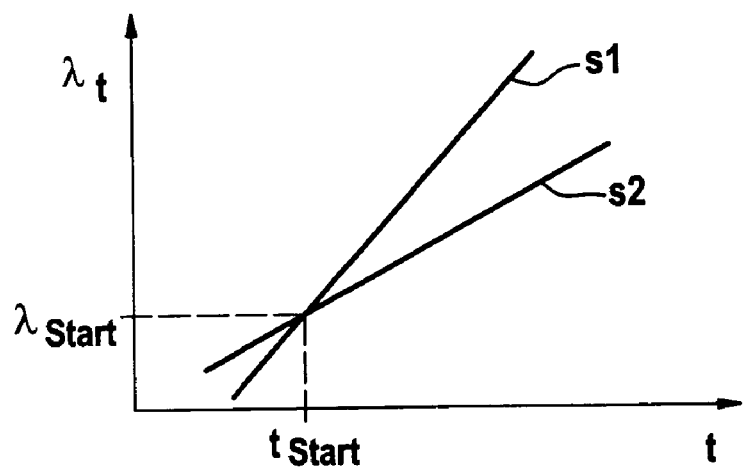
FIG. 2 shows functional dependencies of wavelength vs. time of two simultaneously tuned and incoupled signals.

Detector units 6, 8 receive the modulated signals $\hat{s}_1(t, \omega)$ and $\hat{s}_2(t, \omega)$, respectively. An inspection of the wavelength dependent response characteristic $d(\omega)$ is aimed at. Accordingly, the wavelengths $\lambda_t$ of incoupled signals $s_1$ and $s_2$ are tuned with a constant sweep speed as shown in FIG. 2. There is a time mark $t_{start}$, where both laser sources 2, 4 are tuned to attain the same wavelength $\lambda_{start}$. In what follows, $t_{start}$ serves as a zero point on the time axis.

Using the method of the invention the two signals $s_1$, $s_2$ are used to image a same group delay characteristic of the device (10) and a same time-dependent characteristic of a disturbance signal acting upon the device (10), independently. The relevant wavelength and time range is covered by both signals. By transforming the two response signals depending on wavelength and time as variables appropriately, a time-dependent and a wavelength-dependent response characteristic can be derived.

Figure 8:
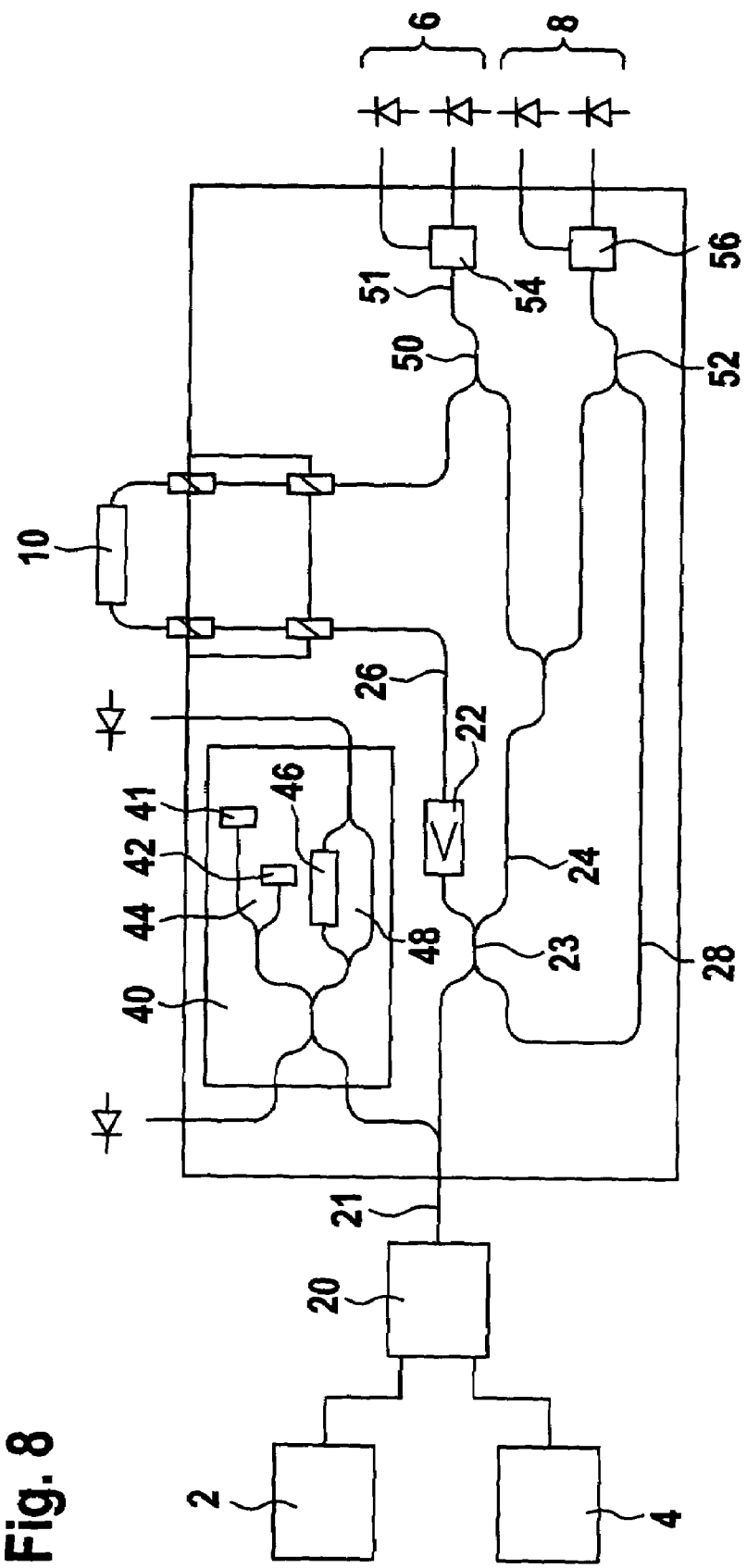
FIG. 8 an arrangement including a measurement apparatus for determining a disturbance free group delay function according to the present invention.

A more detailed arrangement according to the present invention is displayed in FIG. 8. The first and second signal generated by laser sources 2, 4 is first input to a polarization controller 20, which may additionally be used to inspect polarization dependent characteristics of optical device 10. Both signals are then superimposed and portion is split off towards a wavelength reference unit 40. A first part 44 of the wavelength reference unit comprises Faraday mirrors 41, 42 providing a different optical path length in order to calibrate relative wavelength difference between the two signals coupled in.

A second part 48 comprises an HCN gas cell, which is arranged in a Mach-Zehnder path layout for providing an absolute calibration of wavelengths with respect to an absorption characteristic of the HCN gas cell. Detector units are used to derive time and wavelength information as measured using the first and second parts 44, 48.

Another portion of the superimposed signals travels on its joint path towards an optical coupler 23, where it is split into a first and a second portion. The first portion moves on path 26 via a switch 22 towards an external DUT 10, the second portion moves further on path 24. Having transferred the DUT 10 thereby receiving a characteristic group delay and an external disturbance modulation by means of, e.g., vibration, the first portion of the incoming signals is heterodyned with the second portion in an optical coupler 50. A detector unit 6 is used to record an interferogram, possibly distinguished by polarization splitters 54, 56.

Along a path 28 a response signal reflected by device 10 can be heterodyned with signals of the second portion and recorded at detector unit 8.

Figure 4:
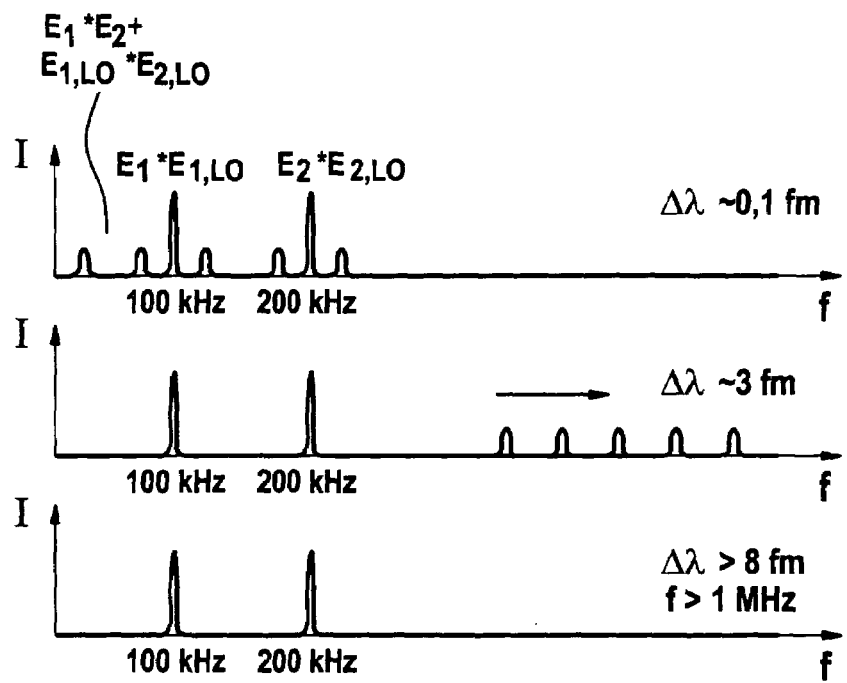
FIG. 4 shows the development of carrier frequencies of heterodyned signals.

In FIG. 4 the evolution of spectra of the heterodyned signals is shown. A constant sweep speed of $v_1=40$ nm/s is applied for tuning the wavelength of the first signal and a constant sweep speed of $v_2=20$ nm/s is applied for tuning the wavelength of the second signal as shown in FIG. 2. Accordingly, at the detector unit 6 four electrical fields interfere at a time t:

$E_{1,DUT}(\omega_1+\Delta\omega_1)$ with $\Delta\omega_1=v_1*L*\omega_1^2/c^2$
$E_{1,LO}(\omega_1)$
$E_{2,DUT}(\omega_2+\Delta\omega_2)$ with $\Delta\omega_2=v_2*L*\omega_2^2/C^2$
$E_{2,LO}(\omega_2)$, where "DUT" denotes the DUT path signal, and "LO" denotes the local oscillator path signal, and indices refer to the first or second laser source, respectively.

Since both the first and the second signal pass the same polarization controller, all fields reveal the same polarization. The arm length L causes a phase delay proportional to the sweep speed. Accordingly, two interferograms form at carrier frequencies $\omega_1$, and $\omega_2$, representing signal $E_{1,DUT}$ heterodyned with $E_{1,LO}$ and a signal $E_{2,DUT}$ heterodyned with $E_{2,LO}$. Additionally, E1 and E2 fields counteract with each other, however, as shown in FIG. 4 already 16 fs after $t_{start}$ the wavelength difference increases to 8 pm corresponding to 1 GHz, which is far beyond typically used bandpass frequencies of the receiver.

Figure 3:
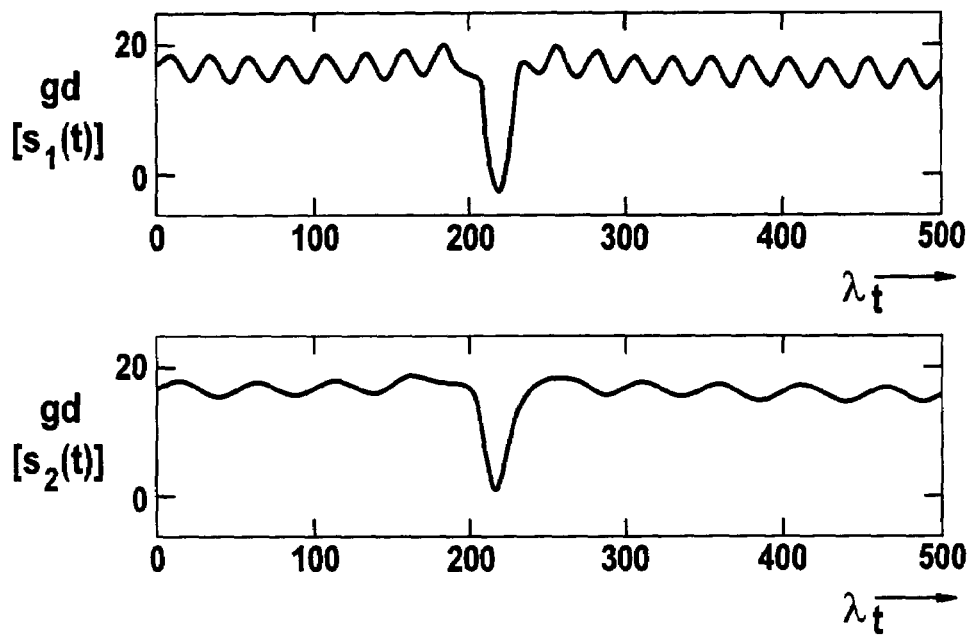
FIG. 3 shows group delay functions with respect to wavelength number recorded with respect to the incoupled signals.
Figure 5:
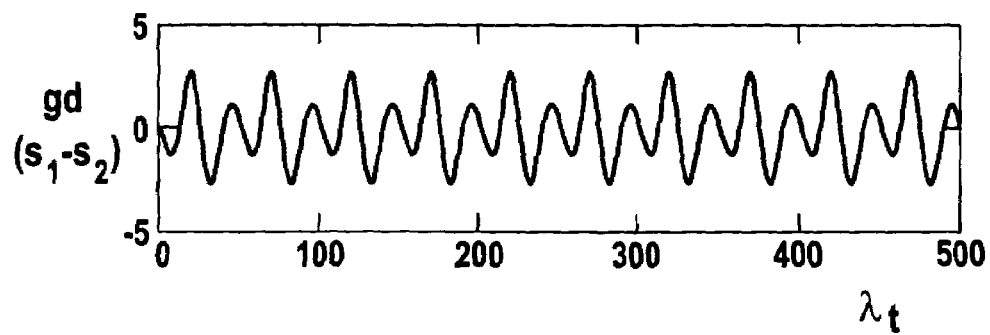
FIG. 5 shows an overlay of the two group delay functions displayed in FIG. 3.

For the carrier frequencies is each derived a group delay function $gd_1$ or $gd_2$ (FIG. 3, arbitrary system units are used for the time or wavelength axes throughout the figures). In order to retrieve an as far as possible pure disturbance signal information, the time axis is rearranged in terms of wavelength according to FIG. 2. In this representation a subtraction of one function from the other removes the wavelength-dependent characteristic of the device from a resulting difference function, which is shown in FIG. 5.

Figure 6A:
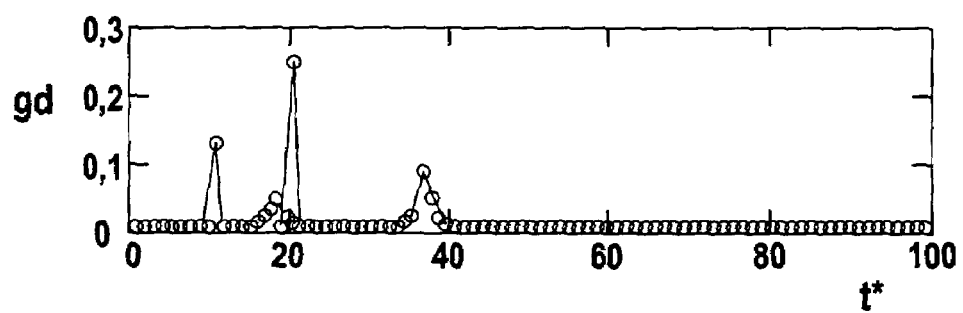
FIG. 6 shows (a) Fourier-spectra of the overlaid group delay functions and (b) a correlation function between signatures identified within the spectra.
Figure 6B:
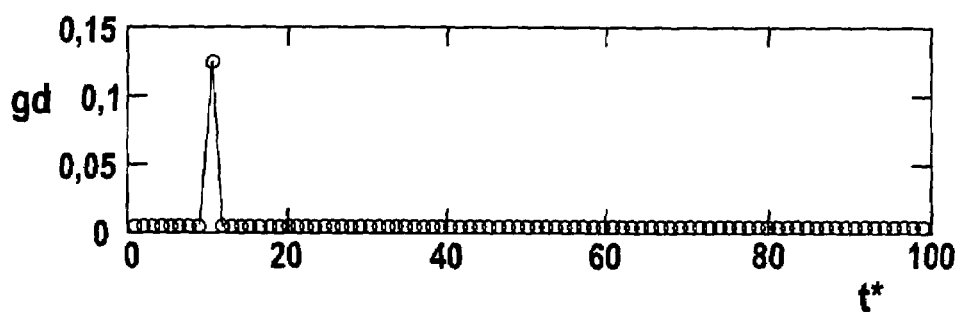
Figure 7A:
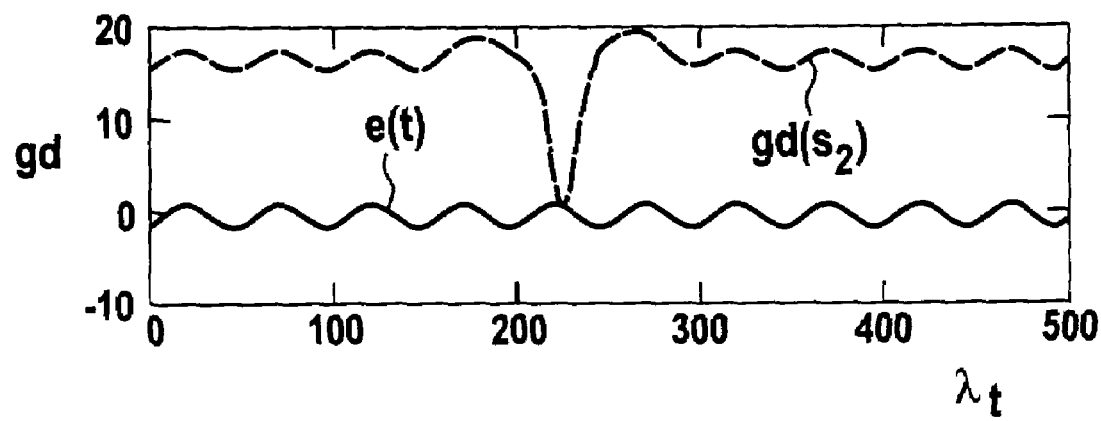
Figure 7B:
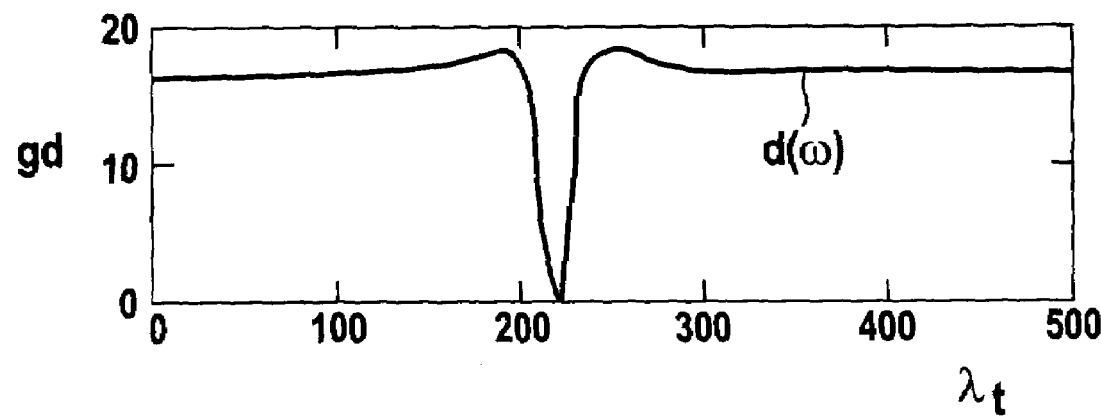

A Fourier transform is performed (FIG. 6a) and the signatures of the heterodyned signals corresponding to the carrier frequencies retained within the bandpass frequency are correlated with each other. The correlation function (FIG. 6b) is then re-expanded to derive a group delay function representing a substantially pure disturbance signal (FIG. 7a). This signal can be subtracted from the appropriate one of the original group delay functions $gd_1$ or $gd_2$. A substantially disturbance-free group delay function revealing the signal response characteristic of the DUT 10 is obtained (FIG. 7b). Also, an iterative process repeating the steps explained above can be employed in order to even further improve the quality of the group delay function derived.

What is claimed is:

1. A method of determining a signal response characteristic of a device, the method comprising:
   providing a first signal having a first wavelength that varies with a first function of time and simultaneously providing a second signal having a second wavelength that varies with a second function of time, wherein the first function is different from the second function;
   coupling the first and second signals to the device, wherein the device is exposed to a time-dependent disturbance signal;
   receiving a signal response from the device in response to the first and second signals and the time-dependent disturbance signal; and
   deriving the signal response characteristic by analyzing the received signal response in conjunction with the first and second signals, or a signal derived therefrom, and at least partially removing the time-dependent disturbance signal using the received signal response and the first and second signals, or a signal derived therefrom.

2. The method of claim 1, further comprising:
   splitting the first and second signals each into a first and a second portion and coupling the first portions of the first and second signals into the device;
   superimposing the received signal response with the second portions of the first and second signals; and
   deriving the signal response characteristic from at least two of the superimposed signals.

3. The method of claim 2, wherein the step of deriving the signal response characteristic from at least two of the superimposed signals comprises:
   at least partially recovering the time-dependent disturbance signal from the at least two superimposed signals, and
   at least partially separating the time-dependent disturbance signal from the signal response characteristic of the device.

4. The method of claim 2, further comprising:
   detecting a first superimposed signal having a first carrier frequency that depends on the first function of time, and detecting a second superimposed signal having a second carrier frequency that depends on the second function of time and differs from the first carrier frequency;
   comparing the first with the second superimposed signal for recovering the time-dependent disturbance signal; and
   subtracting the recovered time-dependent disturbance signal from at least one of the first and second superimposed signals.

5. The method according to claim 4, wherein detecting the first and second superimposed signals having first and second carrier frequencies comprises:
   detecting the power of each of the superimposed signals as a function of at least one of time and frequency to establish an interferogram representation of each of the superimposed signals; and
   determining a group delay function of time from each of the interferogram representations.

6. The method according to claim 4, wherein comparing the first with the second superimposed signal comprises: rearranging group delay functions of time as group delay functions of wavelength using the first or second varied wavelength functions of time, respectively, once or repetitively in an iterative process.

7. The method according to claim 4, wherein comparing the first with the second superimposed signal comprises subtracting the first rearranged group delay function from the second rearranged group delay function for removing a signal response characteristic from a resulting difference signal, once or repetitively in an iterative process.

8. The method according to claim 4, wherein comparing the first with the second superimposed signal comprises applying a Fourier-transform to the difference signal, once or repetitively in an iterative process.

9. The method according to claim 4, wherein comparing the first with the second superimposed signal comprises identifying a first signature within the difference signal representing the time-dependent disturbance signal modulating the first signal and a second signature representing the time-dependent disturbance signal modulating the second signal, once or repetitively in an iterative process.

10. The method according to claim 4, wherein comparing the first with the second superimposed signal comprises correlating the first signature with the second signature, once or repetitively in an iterative process.

11. The method according to claim 4, wherein comparing the first with the second superimposed signal comprises applying inverse Fourier-transform to the first signature to retrieve the time-dependent disturbance signal, once or repetitively in an iterative process.

12. The method according to claim 4, wherein comparing the first with the second superimposed signal comprises subtracting the time-dependent disturbance signal from the group delay function that corresponds to the first signal, once or repetitively in an iterative process.

13. The method according to claim 1, wherein at least one tunable laser source is employed to generate optical first and/or second signals, and the device is an optical device.

14. The method according to claim 1, wherein at least one of the first or second functions of time is provided with a substantially linear variation of wavelength with time.

15. The method according to claim 1, further comprising measuring a relation between wavelength and time for each of the signals.

16. The method according to claim 1, wherein simultaneously providing the first and second signals includes establishing a time mark, where a feature of the first signal coincides with a feature of the second signal.

17. The method according to claim 16, wherein the time mark serves as a zero point in each of a plurality of group delay functions.

18. The method according to claim 1, wherein providing the first and the second signals comprises amplitude modulating the first signal with the first function of time.

19. The method according to claim 1, wherein simultaneously providing the first and second signals includes establishing a time mark, where a wavelength of the first signal coincides with a wavelength of the second signal.

20. The method according to claim 1, wherein providing the first and the second signals comprises amplitude modulating the second signal with the second function of time.

21. An apparatus for determining a signal response characteristic of a device exposed to a time-dependent disturbance signal, the apparatus comprising:
at least one signal source providing a first signal having a first wavelength that varies with a first function of time and simultaneously providing a second signal having a second wavelength that varies with a second function of time,
wherein the first function is different from the second function, and wherein the first and second signals are input to the device; and
an analysis unit for deriving the signal response characteristic by analyzing a signal response from the device in conjunction with the first and second signals, or a signal derived therefrom, and at least partially removing the time-dependent disturbance signal using the received signal response and the first and second signals, or the signal derived therefrom.

22. The apparatus of claim 21, wherein the at least one signal source provides the first signal and the second signal with a substantially narrow linewidth each.

23. The apparatus of claim 21, further comprising:
a first signal splitter being arranged in a path of an incoming superimposed signal comprising the first and the second signals for splitting the incoming signal into a first portion traveling a first path and a second portion traveling a second path, wherein the first path is configured to provide the first portion to the device exposed to the time dependent disturbance signal;
a second signal splitter arranged within the first and within the second path for superimposing the first and second portion of the incoming signal after the first portion has traveled a different path length than the second portion, to produce interference between the first and the second portion in the superimposed signals traveling a resulting path;
a detector unit within the resulting path for detecting the power of the superimposed signals traveling the resulting path as a function of at least one of frequency and time when tuning the frequency of the incoming signal over a given frequency range; and
a wavelength reference unit connected to the path of the incoming signal, the wavelength reference unit being adapted for determining the wavelength of each of the first or second signal within the incoming signal and further comprising, a control unit for determining a function between time the wavelength of each of the first or second signal within the incoming signal, the control unit being connected with the detector unit for providing an analysis of the superimposed signals.

24. The apparatus of claim 23, wherein the control unit is adapted to perform a Fourier-transform of signal data detected by the detector unit.

25. The apparatus of claim 21, wherein the at least one signal source comprises a first wavelength tunable signal source for generating the first signal and a second wavelength tunable signal source for generating the second signal.

26. The apparatus of claim 21, further comprising a receiver for receiving the signal response from the device in response to the first and second signals.

* * * * *